(12) United States Patent
Lin et al.

(10) Patent No.: US 11,993,025 B2
(45) Date of Patent: May 28, 2024

(54) FIXING ASSEMBLY FOR MOUNTING UV LAMPS, CURING DEVICE HAVING THE SAME, AND CURING METHOD USING THE SAME

(71) Applicant: TRIPLE WIN TECHNOLOGY(SHENZHEN) CO.LTD., Shenzhen (CN)

(72) Inventors: Yen-Sheng Lin, New Taipei (TW); Yu-Wen Chen, New Taipei (TW)

(73) Assignee: TRIPLE WIN TECHNOLOGY(SHENZHEN) CO.LTD., Shenzhen (CN)

(*) Notice: Subject to any disclaimer, the term of this patent is extended or adjusted under 35 U.S.C. 154(b) by 0 days.

(21) Appl. No.: 17/852,345

(22) Filed: Jun. 28, 2022

(65) Prior Publication Data
US 2023/0008235 A1  Jan. 12, 2023

(30) Foreign Application Priority Data

Jul. 8, 2021 (CN) .......................... 202110773782.2

(51) Int. Cl.
| | | |
|---|---|---|
| *B29C 35/08* | (2006.01) | |
| *B29C 35/00* | (2006.01) | |
| *B29C 65/48* | (2006.01) | |
| *F21V 21/15* | (2006.01) | |

(52) U.S. Cl.
CPC ........ *B29C 65/4845* (2013.01); *B29C 35/002* (2013.01); *B29C 35/0805* (2013.01); *F21V 21/15* (2013.01); *B29C 2035/0827* (2013.01)

(58) Field of Classification Search
CPC ............ B29C 65/4845; B29C 35/0805; B29C 2035/0827; F21V 21/15; F16M 11/18; F16M 11/08
See application file for complete search history.

(56) References Cited

FOREIGN PATENT DOCUMENTS

| | | | |
|---|---|---|---|
| CN | 212219288 U | | 12/2020 |
| CN | 112605400 A | * | 4/2021 |
| CN | 112605400 A | | 4/2021 |
| CN | 113681893 A | * | 11/2021 |

* cited by examiner

*Primary Examiner* — Daniel McNally
(74) *Attorney, Agent, or Firm* — ScienBiziP, P.C.

(57) ABSTRACT

A fixing assembly for mounting UV lamps includes a base, a first gear and a plurality of mounting modules. The first gear is arranged on one side of the base; the mounting modules are arranged around the first gear. The mounting module includes a first driving assembly, a second driving assembly and a support frame. The first driving assembly is used to drive the second driving assembly and the support frame to move circumferentially around the first gear in a considerably horizontal plane, and the second driving component is used to drive the support to move back in a considerably vertical direction. The support frame is used for mounting UV lamp. The flexibility of the fixing assembly is improved. The UV lamp may comprehensively irradiate and cure the photosensitive adhesive.

18 Claims, 5 Drawing Sheets

FIXING ASSEMBLY FOR MOUNTING UV LAMPS, CURING DEVICE HAVING THE SAME, AND CURING METHOD USING THE SAME

FIELD

The subject matter herein generally relates to photosensitive adhesive curing, and more particularly, to a fixing assembly for mounting UV lamps, a curing device having the fixing assembly, and a light curing method using the curing device.

BACKGROUND

During assembly of an electronic device such as a camera module, a photosensitive adhesive is used to bond different components of the electronic device together. To cure the photosensitive adhesive, an UV curing device emits UV light towards the photosensitive adhesive, which causes the photosensitive adhesive to undergo a photochemical reaction and generate a crosslinked network. During use, the UV curing device is often mounted on a fixed frame.

However, when use the UV curing device to cure the photosensitive adhesive coated on a workpiece with an irregular shape, directions of the emitted UV light cannot be adjusted, which resulting in an insufficient curing of some area of the photosensitive adhesive.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

The term "comprising," when utilized, means "including, but not necessarily limited to"; it specifically indicates open-ended inclusion or membership in the so-described combination, group, series, and the like.

Figure 1:
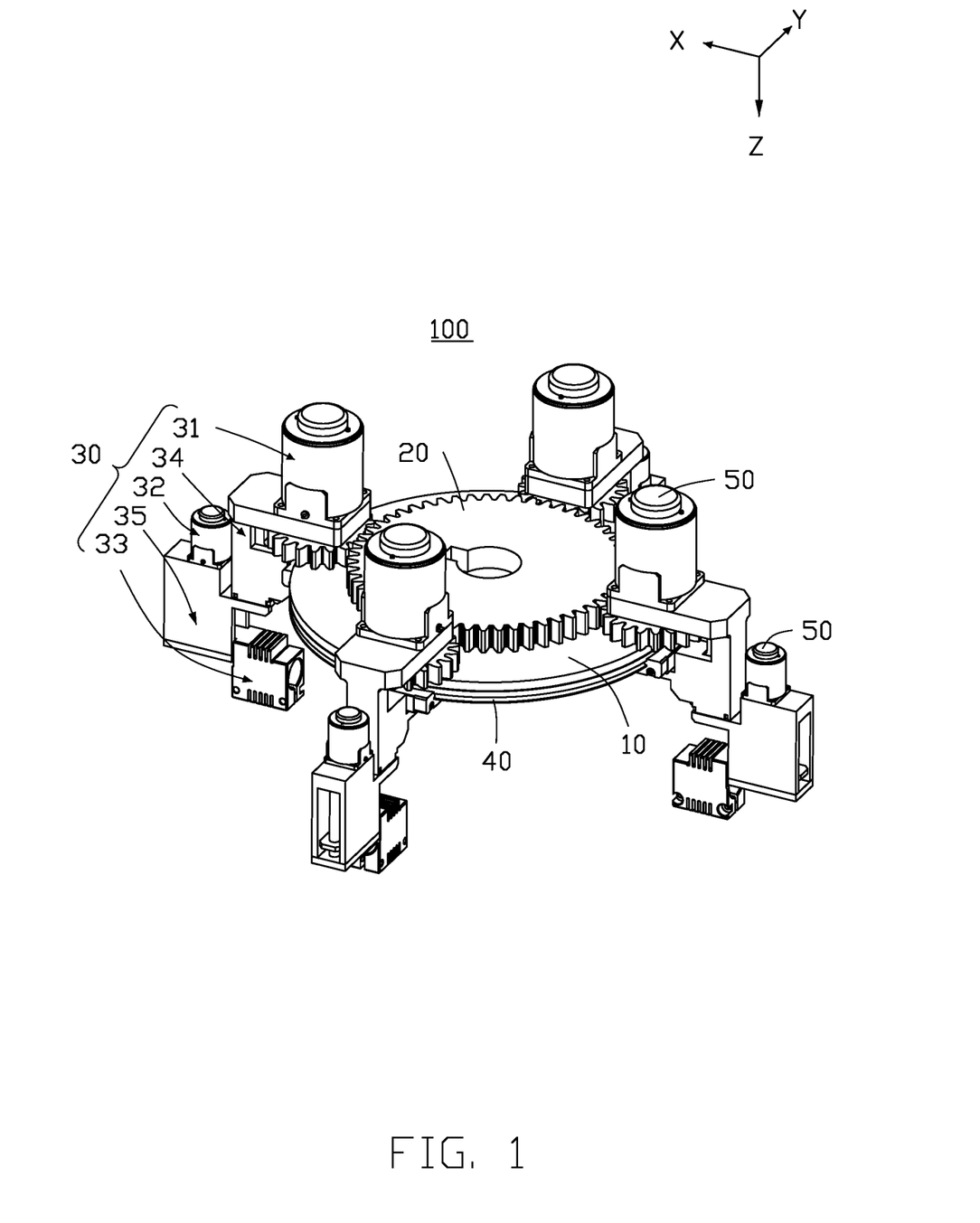
FIG. 1 is a diagrammatic view of a fixing assembly according to an embodiment of the present disclosure.
Figure 2:
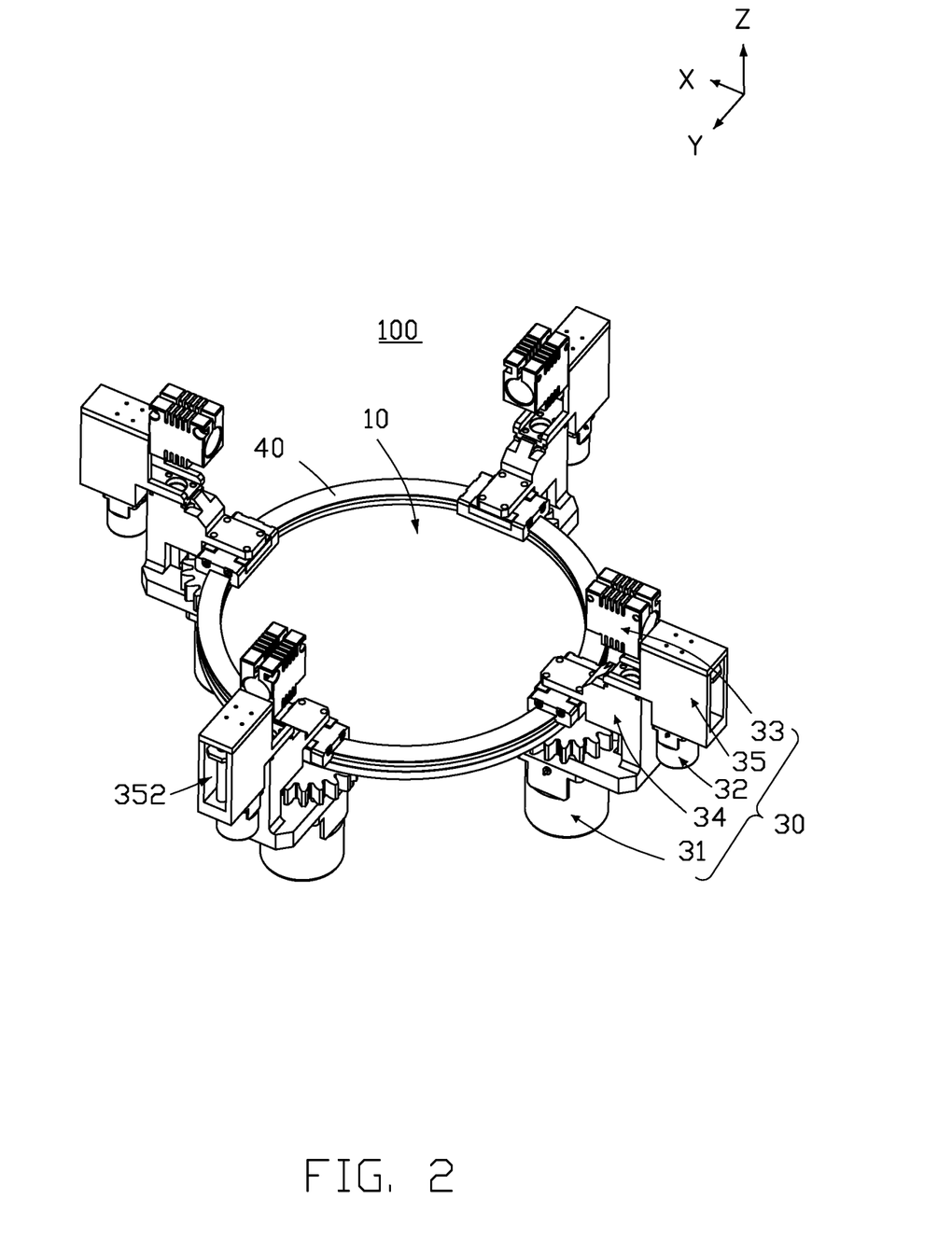
FIG. 2 is similar to FIG. 1, but showing the fixing assembly from another angle.

Referring to FIGS. 1 and 2, an embodiment of a fixing member 100 is provided according to the present disclosure. The fixing member 100 can be used to mounting UV lamps (not shown) thereon, and can change positions of the UV lamps. Thus, a direction of UV light emitted by the UV lamps can be changed.

The fixing member 100 includes a base 10, a first gear 20, and a plurality of mounting modules 30. The first gear 20 is disposed on a surface of the base 10. The mounting modules 30 are evenly arranged around a periphery of the first gear 10. Each mounting module 30 includes a first driving assembly 31, a second driving assembly 32, and a support frame 33. The first driving assembly 31 is engaged with the periphery of the first gear 32. The second driving assembly 32 connects to the first driving assembly 31. The support frame 33 connects to the second driving assembly 32. The first driving assembly 31 drives the second driving assembly 32 and the support frame 33 to move around the first gear 20. The second driving assembly 32 driving the support frame 33 to move back and forth along a first direction Z perpendicular to the surface of the base 10. The support frame 33 is used for mounting one UV lamp.

Referring to FIG. 1, in this embodiment, totally four mounting modules 20 are arranged around the first gear 20, and each mounting module 20 can install one UV lamp. Thus, four UV lamps can emit UV light from different directions towards a photosensitive adhesive applied on a workpiece (not shown), causing the photosensitive adhesive to undergo a photochemical reaction and generate a crosslinked network. In other embodiment, the number of the mounting modules 20 could be two, three, five or more, and each mounting module 20 can install more than one UV lamp based on the number of workpieces.

Referring to FIGS. 1 and 2, in this embodiment, the first driving assembly 31 drives the mounting module 30 to move in a same direction or different direction. For example, the four mounting modules 30 can move clockwise. In other embodiments, a portion of the four mounting modules 30 moves clockwise, and the remaining portion of the four mounting modules 30 move counterclockwise. When two adjacent mounting modules 30 move in opposite direction (for example, one moves clockwise, another one moves counterclockwise), the UV light emitted from the two UV lamps overlap with each other to produce a larger radiation area. The larger radiation area can entirely cover the photosensitive adhesive, which is beneficial for bonding workpieces of irregular shapes or of big in size.

Referring to FIGS. 1 and 2, in this embodiment, the base 10 is substantially a circular plate, and the first gear 20 is a circular gear. The mounting modules 30 is arranged on a peripheral edge of the base 10, and the base 10 will not interfere with the mounting module 30 that moves in a circular direction. In other embodiments, the base 10 can also be regular polygon-shaped or an irregular polygon-shaped, and the first gear 20 is a ring gear. The mounting module 30 may be set only on a surface away of the base 10 as to ensure that the base 10 does not interfere with the mounting module 30.

Referring to FIGS. 1 and 2, in this embodiment, the fixing member 100 further includes an annular guide rail 40 arranged on another surface of the base 10 opposite to the first gear 20. The mounting module 30 further includes a rail connector 34 movably connected to the annular guide rail 40. The first driving assembly 31 and the second driving assembly 32 are both connected to the rail connector 34.

Figure 3:
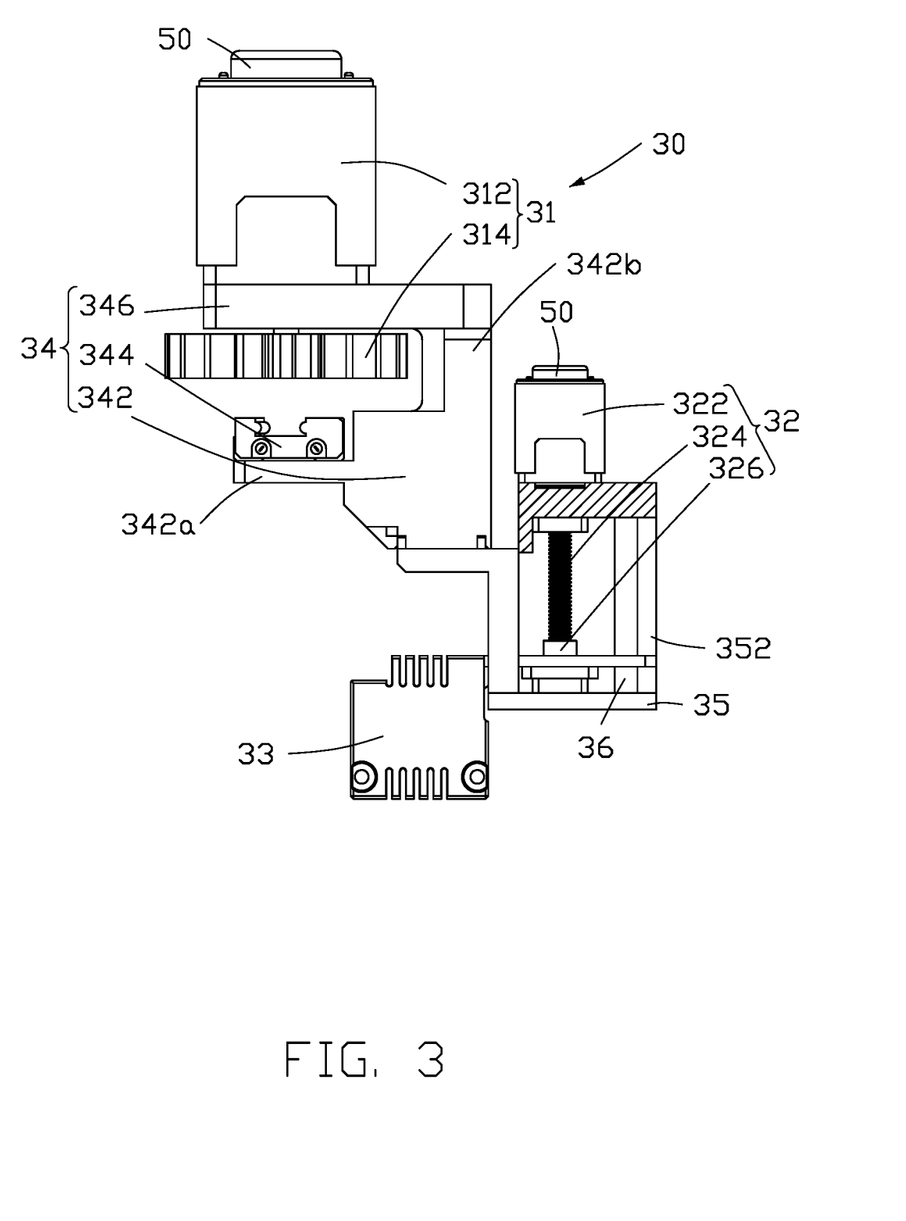
FIG. 3 is a diagrammatic view of the fixing assembly of FIG. 1, with a first gear and a base moved.

Referring to FIGS. 1, 2 and 3, in this embodiment, the cross-section of the annular guide rail 40 is substantially H-shaped. The rail connector 34 is substantially U-shaped, and includes a first connecting member 342, a second connecting member 344, and a third connecting member 346. The first connecting member 342 is L-shaped and includes a first end portion 342a and a second end portion 342b that is substantially perpendicular to the first end portion 342a. The third connecting member 346 is connected to the second end portion 342b, the third connecting member 346 faces the first end portion 342a, and the third connecting member 346 and the first connecting member 342 cooperatively define the U-shaped rail connector 34. The second connecting member 344 is connected to the first end portion 342a, the second connecting member 344 faces the third connecting member 344. The second connecting member 344 is slidably connected to the guide rail 40. The second driving assembly 32 is connected to first connecting member 342, the second driving assembly 32 faces away from the second connecting member 344. The first driving assembly 32 is connected to the third connecting member 346 and faces away from the second connecting member 344.

Referring to FIG. 3. The first driving assembly 32 includes a first driver 312 and a first rotation portion 314. The third connecting member 346 is a plate-shaped structure. The rotation portion 314 can be a gear (hereinafter, a second gear), and is arranged on a surface of the third connecting member 346 facing the second connecting member 344. The first driver 312 can be a servomotor, and is arranged on another surface of the third connecting member 346. A shaft (not shown) of the first driver 312 penetrates the third connecting member 346 and connects to the first rotation portion 314. The first driver 312 drives the first rotation portion 314 to rotate about the shaft.

When the mounting module 30 moves, the first driver 312 drives the first rotation portion 314 to rotate. The rotation portion 314 engages with the first gear 20 and drives the rail connector 34 to move. In addition, the annular guide rail 40 allows the rail connector 34 to circularly move.

Referring to FIGS. 2 and 3, in this embodiment, the mounting module 30 further includes a guiding connector 35 connected to the first connector member 342. The guiding connector 35 defines a guiding groove 352 that extends along the first direction Z. At least a part of the support frame 33 is disposed within the guiding groove 352. Thus, the rail connector 34 connects to and supports the guiding connector 35 and the support frame 33.

Referring to FIGS. 1, 2 and 3, the second driving assembly 32 includes a second driver 322, a second rotation portion 324, and a rotation connector 326. The second rotation portion 324 is a screw rod. An end portion of the second rotation portion 324 connects to the second driver 322, another end portion of the second rotation portion 324 connects to the rotation connector 326. The rotation connector 326 rotates around the end portion of the second rational part 324. The part of the support frame 33 disposed in the guiding groove 352 connects to the rotation connector 326. The second driver 322 drives the second rotation portion 324 to rotate. The rotation connector 326 is substantially in a horizontal position, and the second rotation connector 326 drives the rational connector 326 to move up and down along the first direction Z. In this embodiment, the second driver 322 is a servomotor, and the second rotation portion 324 adapted to the rotation connector 326 to obtain a ball screw. In other embodiment, the second driver 322 is a stepped motor.

Referring to FIGS. 1, 2 and 3, the mounting module 30 further includes a guiding member 36. The guiding member 36 is substantially rod-shaped. The guiding member 36 movably passes through the rotation connector 326. The guiding member 36 is parallel to the rotation connector 326. The guiding member 36 is used for guiding a moving direction of the rotation connector 326.

Referring to FIGS. 1, 2 and 3, the fixing assembly 100 further includes a plurality of position member 50. The position members 50 are disposed on the first driver 31 and the second driver 32. The position member 50 can obtain motion data, such as, angle or number of turns, of the first driver 31 and the second driver 32. In this embodiment, the position members 50 can be encoders. Eight position members 50 are respectively connected to the first driver 312 and the second driver 322. Based on the motion data, a relative position of the first driver 312 and the second driver 322 on the base 10 can be determined, that is, the relative position of each UV lamp on the base 10 can be determined, which is conducive to accordingly adjusting of the relative position of the UV lamp.

When the number of turns of the first driver 312 and the second driver 322 obtained by the encoder is zero, it indicates that the UV lamp on the mounting module 30 is in an initial position.

After a first rotation of the first driver 312, and the number of turns of the first driver 312 obtained by the encoder is a positive value, it indicates that the UV lamp on the mounting module 30 moves clockwise in the XY plane shown in FIGS. 1 and 2, and the position of the UV lamp on the mounting module 30 changes in relative to the initial position.

After a second rotation of the first driver 312, and the number of turns of the first driver 312 obtained by the encoder is a negative value, it indicates that the UV lamp on the mounting module 30 moves counterclockwise in the XY plane, and the position of the UV lamp on the mounting module 30 changes in relative to the initial position.

After the first rotation of the second driver 322, when the number of turns of the second drive 322 obtained by the encoder is a positive value, it indicates that the UV lamp on the mounting module 30 moves forward in the first direction Z shown in FIGS. 1 and 2, and the position of the UV lamp on the mounting module 30 changes in relative to the initial position.

After the second rotation of the second driver 322, when the number of turns of the second driver 322 obtained by the encoder is negative, it indicates that the UV lamp on the mounting module 30 moves in the reverse direction of the first direction Z, and the position of the UV lamp on the mounting module 30 changes in relative to the initial position.

In this way, the position of the UV lamp on the mounting module 30 can be adjusted through a separate action or a combined action of the first driver 312 and the second driver 322.

In other embodiments, the position member 50 may also be an angle sensor that can obtain the motion data of the first driver 312 and the second driver 322. The position member 50 may also be a camera that can capture the motion data of the first driver 31 and the second driver 32.

The fixing assembly 100 provided in this embodiment includes the first gear 20 and a plurality of mounting modules 30 arranged on the periphery of the first gear 20.

Each mounting module 30 includes the first driving assembly 31, the second driving assembly 32, and the support frame 33. The support frame 33 is used to install the UV lamp, and the first driving assembly 31 is used to drive the second driving assembly 32, the support frame 33, and the UV light mounted on the support 33 to move around the first gear 20. The second drive assembly 32 is used to drive the support frame 33 and the UV lamp mounted on the support frame 33 to move back and forth in the first direction Z. Thus, after the UV lamps are installed on the support frame 33, the relative position of UV lamps can be adjusted, thereby allowing the UV lamp to fully irradiate and cure the photosensitive adhesive coated on an irregular shaped workpiece. Insufficient curing of the photosensitive adhesive is avoided.

Figure 4:
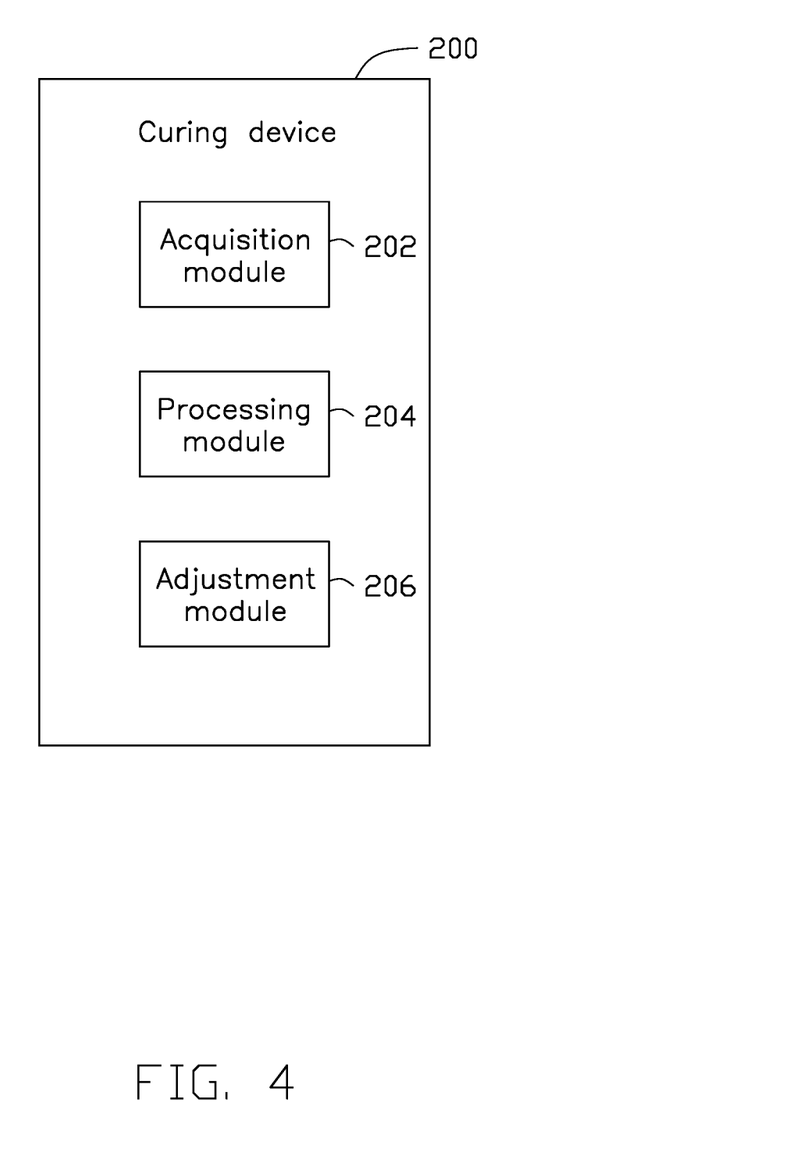
FIG. 4 is block diagram of a curing device of the fixing assembly of FIG. 1.

Referring to FIG. 4, an embodiment of a curing device 200 is provided according to the present disclosure. The curing device 200 includes the fixing assembly 100, a plurality of UV lamps, and a support pedestal (not shown). The UV lamps are mounted on the support frame 33 of the fixing assembly 100. The fixing assembly 100 is disposed on the support pedestal. The workpiece coated with the photosensitive adhesive is disposed on the support pedestal. In some embodiments, four UV lamps are arranged around the workpiece, so that the UV light emitted can be directed to the photosensitive adhesive from four different directions.

In this embodiment, the curing device 200 further includes an acquisition module 202, a processing module 204, and an adjustment module 206. The acquisition module 202 is used for collecting motion data of the first driving assembly 31 and the second driving assembly 32. The acquisition module 202 also collects curing data of the photosensitive adhesive, and the curing data can be data indicating a process of the photosensitive reaction progress measured by NMR (Nuclear magnetic resonance) or IR spectrum analysis. The processing module 204 is used for comparing the collected motion data with a preset motion data to obtain a first motion result, and comparing the collected curing data with a preset curing data to obtain a first curing result. The adjustment module 206 is used for adjusting positions of the first driving assembly 31 and the second driving assembly 32 based on the first motion result as well as the first curing result.

In this embodiment, the acquisition module 202 includes a communication unit (not shown) connected to the position member 50 for receiving the motion data of the first driving assembly 31 and the second driving assembly 32 obtained by the position member 50. The communication unit can be WIFI unit, BLUETOOTH unit, and so on. The acquisition module 202 can also include a camera (not shown). The camera can be part of the support pedestal or set independently on the support pedestal. The camera is used to capture images reflecting the curing process of the photosensitive adhesive from multiple directions. The acquisition module 202 can also include a processor to obtain quantifiable curing data of the photosensitive adhesive through NMR analysis of the images.

In this embodiment, the processing module 204 may be a processor, which may be part of the curing device 200 or set independently of the curing device 200. The processor can be a central processing unit (CPU), and can also include other general-purpose processor, like a digital signal processor (DSP) or an application specific integrated circuit (ASIC). The processor can be a microprocessor or a processor, or any conventional processor. The processor is the control center of the curing device 200 and uses various interfaces and lines to connect all parts of the whole curing device 200.

In this embodiment, the adjustment module 206 can also be a processor, which is used to receive the first motion result and the first curing result of the processing module 204, form an instruction according to the first motion result and the first curing result, and send the instruction to the first driving assembly 31 and the second driving assembly 32, so that the UV lamps can irradiate the photosensitive adhesive at a new position in relative to the initial position, and finally make the curing of the photosensitive adhesive to meet the requirements. It can be understood that adjusting the first drive assembly 31 and the second drive assembly 32 can be adjusted separately or together according to the adjustment module 206.

The curing device 200 provided in this embodiment can adjust the position of the UV lamp and irradiate various irregular-shaped workpieces through the first driving assembly 31 and the second driving assembly 32. The adaptability of the curing device 200 is improved, and the UV lamp can irradiate and cure the photosensitive adhesive on the workpieces more comprehensively. Thus, to avoid the hidden risk of insufficient curing of the photosensitive adhesive due to incomplete irradiation.

The curing device 200 also obtains the position of the UV lamp (herein, as first motion data) and the curing data of the photosensitive adhesive in real time through the acquisition module 202. Comparing the curing data with the preset curing data to form a first curing result, and comparing the first motion data with the preset motion data to obtain the first motion data through the processing module 204. The adjustment module 206 adjusts the first driving assembly 31 and the second driving assembly 32 according to the first motion result and the first curing result, so that the position of the UV lamp can be adjusted accordingly and the UV lamp can more comprehensively irradiate the photosensitive adhesive on the workpiece, to avoid the hidden danger and risk of insufficient curing of the photosensitive adhesive.

Figure 5:
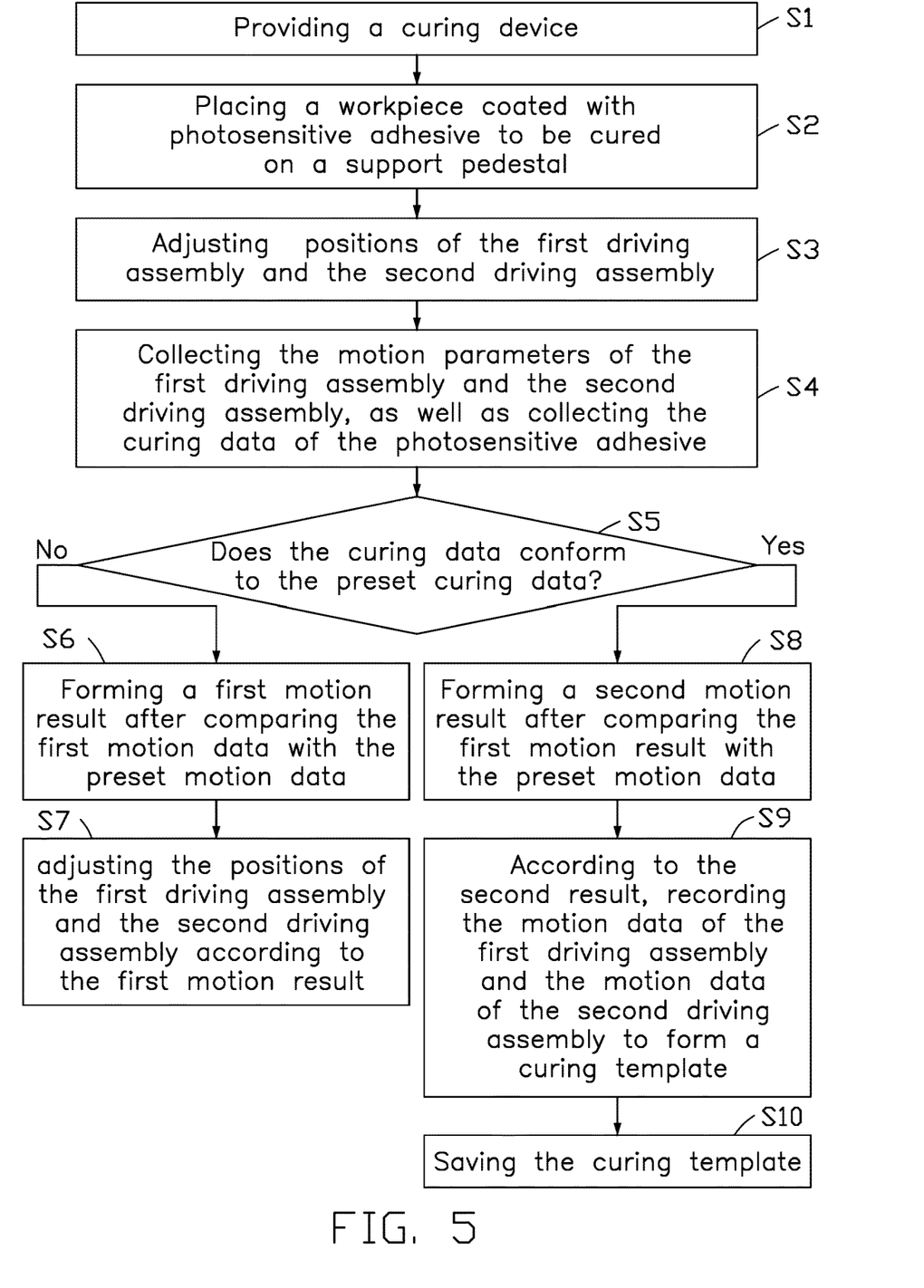
FIG. 5 is a flowchart of a curing method provided by an embodiment of the application.

Referring to FIG. 5, a curing method is provided by way of example, as there are a variety of ways to carry out the method. Each block shown in the figure represents one or more processes, methods, or subroutines, carried out in the example method. Furthermore, the illustrated order of blocks is illustrative only and the order of the blocks can change. Additional blocks can be added, or fewer blocks may be utilized, or the order of the blocks may be changed, without departing from this disclosure. The method can begin at S1 to S10.

S1: providing a curing device 200.

S2: placing a workpiece coated with photosensitive adhesive to be cured on the support pedestal. Specifically, the workpiece is placed on a position so that at least portion of the photosensitive adhesive can be irradiated by the UV light emitted by the UV lamp.

S3: adjusting positions of the first driving assembly 31 and the second driving assembly 32, so that the UV lamp can irradiate the photosensitive adhesive from another different position. Specifically, the first driving assembly 31 and the second driving assembly 32 are adjusted to another position, so that the UV lamp can irradiate another area of the photosensitive adhesive on the workpiece. It can be understood that in step S2, if the workpiece with a flat surface coated with photosensitive adhesive can be fully irradiated in all directions by the UV lamp on the fixing assembly 100, S3 can be omitted.

S4: collecting the motion data of the first driving assembly 31, the motion data of the second driving assembly 32, and the curing data of the photosensitive adhesive. Specifically, the motion data of the first driving assembly 31, the motion data of the second driving assembly 32, and the curing data of the photosensitive adhesive are collected by the acquisition module 202, and the motion data and curing data are sent to the processing module 204.

S5: comparing the curing data with a preset curing data to determine whether the curing data conforms to the preset data. If no, the procedure goes to S6; if yes, the procedure goes to S8. Specifically, the obtained curing data is compared with the preset data through the processing module 204. To be understood, the preset curing data can be different for different workpieces. That is, the curing standard of the photosensitive adhesive can be different when applied on different workpieces.

S6: forming a first motion result when the curing data does not conform to the preset curing data. Specifically, the processing module 204 forms the first motion result after comparing the first motion data with the preset motion data.

S7: adjusting the positions of the first driving assembly 31 and the second driving assembly 32 according to the first motion result, so that the UV lamp irradiates the photosensitive adhesive at a new position. Specifically, the adjustment module 206 adjusts the first driving assembly 31 and the second driving assembly 32 according to the first motion result. After performing S7 in the curing method of this embodiment, a plurality of UV lamps continues to irradiate the photosensitive adhesive in all directions, and the curing method of this embodiment continues to perform step S4 until the curing data conforms to the preset data.

In this embodiment, the curing method can also include S8-S10 after S7.

S8: forming a second motion result when the preset curing data conforms to the curing data. Specifically, the processing module 204 forms the second result after comparing the first motion result with the preset motion data.

S9: according to the second result, recording the motion data of the first driving assembly 31 and the motion data of the second driving assembly 32 to form a curing template.

Specifically, the processing module 204 records the obtained motion data of the first drive assembly 31 and the motion data of the second drive assembly 32 according to the second result to form the curing template. The curing template can be the position on which the UV lamp can fully irradiate the photosensitive adhesive on the workpiece, so that the photosensitive adhesive after being cured meets the requirements.

S10: saving the curing template. Specifically, the curing template is saved. The curing template can be directly used when curing the photosensitive adhesive next time when a same or similar workpiece is irradiated. Thus, the first driving assembly 31 and the second driving assembly 32 directly drive the UV lamp to the corresponding position, and the UV lamps irradiate the photosensitive adhesive on the workpiece at the corresponding position, which is conducive to improving the curing efficiency of the photosensitive adhesive. It can be understood that when placing an identical or similar workpiece on the support pedestal, the curing template can be directly used to adjust the first driving assembly 31 and the second driving assembly 32, that is, step S6 can be omitted.

The curing method provided in this embodiment obtains the first motion data of the UV lamp and the curing data of the photosensitive adhesive in real time by meeting the above steps. Determining whether the curing data conform to the preset curing data, if it does conform, the processing module 204 compare the first motion data with the preset motion data to obtain the first result, if it does not conform, the processing module 204 compare the first motion data with the preset motion data to obtain the second result. The first driving assembly 31 and the second driving assembly 32 were adjusted by the adjustment module 206 according to the first result and the second result. Thus, the UV lamp can irradiate the photosensitive adhesive on the workpiece more comprehensively based on above procedure, to avoid the hidden danger and risk of insufficient curing of the photosensitive adhesive. The curing method can also form a curing template according to the second result formed by the curing data that conforms to the preset data. After saving the curing template, the motion data of the first driving assembly 31 and the motion data of the second driving assembly 32 contained in the curing template can be directly used to make the UV lamp in the correct position when irradiating and curing the same or similar photosensitive adhesive workpiece. Thus, improving the curing efficiency of photosensitive adhesive.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A fixing assembly configured for mounting UV lamps, comprising:
   a base,
   a first gear disposed on a surface of the base, and
   a plurality of mounting modules arranged around the first gear;
   wherein each of the plurality of mounting modules comprises a first driving assembly, a second driving assembly, and a support frame, the first driving assembly is engaged with a periphery of the first gear, the second driving assembly is connected to the first driving assembly, the support frame is connected to the second driving assembly, the first driving assembly is configured to drive the second driving assembly and the support frame to move around the first gear, the second driving assembly is configured to drive the support frame to move along a direction perpendicular to the surface of the base, the support frame is configured for mounting at least one of the UV lamps.

2. The fixing assembly of claim 1, further comprising an annular guide rail disposed on another surface of the base, wherein each of the plurality of mounting modules further comprises a rail connector, the rail connector movably connects to the annular guide rail, the first driving assembly and the second driving assembly are connected to the rail connector.

3. The fixing assembly of claim 2, wherein the rail connector comprises a first connecting member, a second connecting member, and a third connecting member;
   the second connecting member and the third connecting member are connected to the first connecting member, the second connecting member faces the third connecting member,
   the first connecting member further connects to the second driving assembly, the second connecting member is movably connected to the annular guide rail, the third connecting member further connects to the first driving assembly.

4. The fixing assembly of claim 3, wherein the first driving assembly comprises a first driver and a first rotation portion connected to the first driver, the first rotation portion is arranged between the second connecting member and the third connecting member, the first rotation portion connects the first gear.

5. The fixing assembly of claim 4, wherein the first rotation portion comprises a second gear engage with the first gear.

6. The fixing assembly of claim 1, wherein each of the plurality of mounting modules further comprise a guiding connector, the guiding connector defines a guiding groove that extends along a moving direction of the support frame, a portion of the support frame is disposed within the guiding groove.

7. The fixing assembly of claim 6, wherein the second driving assembly comprises a second driver, a second rotation portion, and a rotation connector, one end of the second rotation portion connects to the second driver, another end of the second rotation portion connects to the rotation connector, the rotation connector connects to the support frame and is configured to drive the support frame to move.

8. The fixing assembly of claim 7, wherein each of the plurality of mounting modules further comprises a guiding member extends in a direction parallel to the rotation connector, the guiding member is fixed inside the guiding groove, the rotation connector is movably sleeved on the guiding member.

9. The fixing assembly of claim 7, wherein the second rotation portion comprises a screw rod, the screw rod adapted to the rotation connector to obtain a ball screw structure.

10. A curing device for irradiating an photosensitive adhesive, comprising:
    a support pedestal,
    a fixing assembly disposed on the support pedestal, and
    a plurality of UV lamps mounted on the fixing assembly;
    wherein the fixing assembly comprises:
        a base,
        a first gear disposed on a surface of the base, and
        a plurality of mounting modules arranged around the first gear;
    wherein each of the plurality of mounting modules comprises a first driving assembly, a second driving assembly, and a support frame, the first driving assembly is engaged with a periphery of the first gear, the second driving assembly is connected to the first driving assembly, the support frame is connected to the second driving assembly, the first driving assembly is configured to drive the second driving assembly and the support frame to move around the first gear, the second driving assembly is configured to drive the support frame to move along a direction perpendicular to the surface of the base, the plurality of UV lamps is mounted on the plurality of mounting modules.

11. The curing device of claim 10, wherein the fixing assembly further comprises an annular guide rail disposed on another surface of the base, each of the plurality of mounting modules further includes a rail connector, the rail connector movably is connected to the annular guide rail, the first driving assembly and the second driving assembly are connected to the rail connector.

12. The curing device of claim 11, wherein the rail connector comprises a first connecting member, a second connecting member, and a third connecting member,
the second connecting member and the third connecting member are connected to the first connecting member, the second connecting member faces the third connecting member,
the first connecting member further connects the second driving assembly, the second connecting member movably adapted to the annular guide rail, the third connecting member further connects the first driving assembly.

13. The curing device of claim 12, wherein the first driving assembly comprises a first driver and a first rotation portion connected to the first driver, the first rotation portion is arranged between the second connecting member and the third connecting member, the first rotation portion connects the first gear.

14. The curing device of claim 13, wherein the first rotation portion comprises a second gear, the second gear engage with the first gear.

15. The curing device of claim 10, wherein each of the plurality of mounting modules further comprise a guiding connector, the guiding connector defines a guiding groove that extends along moving direction of the support frame, portion of the support frame is disposed within the guiding groove.

16. The curing device of claim 15, wherein the second driving assembly comprises a second driver, a second rotation portion, and a rotation connector, one end of the second rotation portion connects to the second driver, another end of the second rotation portion connects to the rotation connector, the rotation connector connects to the support frame and is configured to drive the support frame to move.

17. The curing device of claim 16, wherein each of the plurality of mounting modules further comprises a guiding member extends in a direction parallel to the rotation connector, the guiding member is fixed inside the guiding groove, the rotation connector is movably sleeved on the guiding member.

18. The curing device of claim 10, wherein the curing device further comprises an acquisition module, a processing module, and an adjustment module;
    the acquisition module is used for collecting motion data of the first driving assembly, motion data of the second driving assembly, and the curing data of the photosensitive adhesive;
    the processing module is used for comparing the collected motion data, the collected curing data, with a preset data that saved inside the processing module to form a first result;
    the adjustment module is used for adjusting positions of the first driving assembly and the second driving assembly based on the first result.

* * * * *